(12) United States Patent
Kim

(10) Patent No.: US 12,651,534 B2
(45) Date of Patent: Jun. 9, 2026

(54) HOLISTIC STUDENT ASSESSMENT FRAMEWORK BASED ON MULTI-TASK LEARNING

(71) Applicant: Socra AI Inc., Seoul (KR)

(72) Inventor: Jung Hoon Kim, Seongnam-si (KR)

(73) Assignee: Socra AI Inc., Seoul (KR)

(*) Notice: Subject to any disclaimer, the term of this patent is extended or adjusted under 35 U.S.C. 154(b) by 847 days.

(21) Appl. No.: 17/962,227

(22) Filed: Oct. 7, 2022

(65) Prior Publication Data

US 2023/0112222 A1     Apr. 13, 2023

(30) Foreign Application Priority Data

Oct. 8, 2021   (KR) ........................ 10-2021-0133754
Oct. 22, 2021   (KR) ........................ 10-2021-0141504

(51) Int. Cl.
    *G09B 7/02*       (2006.01)
    *G06N 20/00*     (2019.01)

(52) U.S. Cl.
    CPC .............. *G09B 7/02* (2013.01); *G06N 20/00* (2019.01)

(58) Field of Classification Search
    CPC ... G09B 7/02; G09B 7/04; G09B 7/06; G06N 20/00; G06N 3/08
    USPC ........................................................ 434/39
    See application file for complete search history.

(56) References Cited

U.S. PATENT DOCUMENTS

| | | | | |
|---|---|---|---|---|
| 10,943,497 B2 * | 3/2021 | Saini | ...................... | G06N 3/045 |
| 11,321,289 B1 * | 5/2022 | Litman | ............... | G06F 16/2465 |
| 12,367,786 B2 * | 7/2025 | Foster | .................... | G09B 7/077 |
| 2008/0254425 A1 * | 10/2008 | Cohen | .................... | G09B 19/04 |
| | | | | 434/308 |
| 2008/0254426 A1 * | 10/2008 | Cohen | ...................... | G09B 5/06 |
| | | | | 434/308 |
| 2017/0293693 A1 * | 10/2017 | Oros | ..................... | H04L 67/535 |

(Continued)

FOREIGN PATENT DOCUMENTS

| | | |
|---|---|---|
| KR | 10-1895961 B1 | 9/2018 |
| KR | 10-2019-0123105 A | 10/2019 |

OTHER PUBLICATIONS

Chun-Kit Yeung, et al., "Deep-IRT: Make Deep Learning Based Knowledge Tracing Explainable Using Item Response Theory", arXiv:1904.11738v1 [cs.LG], Apr. 26, 2019, pp. 1-10.

(Continued)

*Primary Examiner* — Pierre E Elisca
(74) *Attorney, Agent, or Firm* — USX IP LLC

(57) ABSTRACT

The present disclosure relates to a method of predicting a user's score on a question by an electronic device. The method includes: training a DP-multi tasking learning (DP-MTL) model; verifying the DP-MTL model; receiving choice selection information related to the question from the user through the terminal, and predicting 1) a probability that the user answers the question correctly and 2) the user's score related to the question using the verified DP-MTL model based on the choice selection information, and the DP-MTL model may be a model for predicting the user's score based on 1) information on whether the user answers the question correctly, 2) information on which incorrect answer is selected among choices of the question when the user selects an incorrect answer, and 3) a skill level of the user.

6 Claims, 4 Drawing Sheets

(56) References Cited

U.S. PATENT DOCUMENTS

| 2018/0229124 | A1* | 8/2018 | Hu | ........................... G09B 7/06 |
| 2023/0333867 | A1* | 10/2023 | Agarwal | ................. G06F 40/35 |

OTHER PUBLICATIONS

Tianyu Zhu, et al., "MT-MCD: A Multi-task Cognitive Diagnosis Framework for Student Assessment", Springer International Publishing AG, part of Springer Nature, LNCS 10828, 2018, pp. 318-335.

* cited by examiner

HOLISTIC STUDENT ASSESSMENT FRAMEWORK BASED ON MULTI-TASK LEARNING

CROSS-REFERENCE TO RELATED APPLICATION

This application claims priority to and the benefit of Korean Patent Application No. 10-2021-0133754, filed on Oct. 8, 2021 and Korean Patent Application No. 10-2021-0141504, filed on Oct. 22, 2021 the disclosure of which is incorporated herein by reference in its entirety.

BACKGROUND

1. Field of the Invention

The present disclosure relates to a holistic student assessment framework based on multi-task learning using deep learning.

2. Discussion of Related Art

In the field of education services, accurately estimating a user's knowledge level has a great influence on applications. The most common approach for providing such an assessment is through knowledge tracing (KT) which provides a binary classification of accuracy on questions for a specific user.

However, binarized information on accuracy often ignores information that may be provided by reasoning behind an answer. For example, in a multiple-choice question (MCQ) (e.g., a task known as option tracing (OT)), the reason for choosing a particular option as an answer may provide more information than a simple KT model.

The present disclosure proposes a simple and novel methodology for capturing the information inherent in correct answer accuracy and option selection in a multi-task learning framework.

SUMMARY OF THE INVENTION

The present disclosure is directed to a framework for implementing score prediction (SP) that predicts a student's score in proportion to knowledge tracing (KT), choice tracing (CT), and 0 values that calculate whether students are most likely to answer which choice for a given question and whether an answer is correct or incorrect.

In addition, the present disclosure is directed to a method of improving various educational applications including identifying students' vulnerabilities and recommending customized questions through generalizability of a student assessment framework.

The technical objects to be achieved by the present disclosure are not limited to the technical objects described above, and other technical objects that are not described may be clearly understood by those with ordinary knowledge in the technical field to which the present disclosure belongs from the following description.

According to an aspect of the present invention, there is provided a method of predicting a user's score on a question by an electronic device, including: training a DP-multi tasking learning (DP-MTL) model; verifying the DP-MTL model; receiving choice selection information related to the question from the user through a terminal; and predicting 1) a probability that the user answers the question correctly and 2) the user's score related to the question using the verified DP-MTL model based on the choice selection information, in which the DP-MTL model may be a model for predicting the user's score based on 1) information on whether the user answers the question correctly, 2) information on which incorrect answer is selected among choices of the question when the user selects an incorrect answer, and 3) a skill level of the user.

The training of the DP-MTL model may be based on the following Equation:

$$L_{DP}(\theta_u, a_i) = \lambda L_D + (1 - \lambda)L_P$$

$$= \sum_{i,u} [\lambda[x_{i,u}\log[P(o_{u,i} \mid \theta_u, a_i)]$$

$$+ (1 - x_{i,u})\log\left[\sum_{o_{u,i \neq o_i^*}} P(o_{u,i} \mid \theta_u, a_i)\right]$$

$$+ (1 - \lambda)\log[P(o_{u,i} \mid \theta_u, a_i)]]$$

the u may denote a parameter indicating the user, the $\theta$ may denote a parameter indicating the skill level of the user, and the $a_i$ may denote an item parameter constituting an i-th question.

In the training of the DP-MTL model, the $a_i$ and the $\theta$ may be calculated to minimize the ($L_{DP}(\theta_u, a_i)$).

In the verifying of the DP-MTL model, the $\lambda$ may be verified to minimize the ($L_{DP}(\theta_u, a_i)$).

According to another aspect of the present invention, there is provided an electronic device for predicting a user's score on a question, including: a communication module configured to communicate with a terminal; a memory; and a processor, in which the processor may train a DP-multi tasking learning (DP-MTL) model, verify the DP-MTL model, receives choice selection information related to the question from the user through the terminal, and predict 1) a probability that the user answers the question correctly and 2) the user's score related to the question using the verified DP-MTL model based on the choice selection information, and the DP-MTL model may be a model for predicting the user's score based on 1) information on whether the user answers the question correctly, 2) information on which incorrect answer is selected among choices of the question when the user selects an incorrect answer, and 3) a skill level of the user.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

Figure 1:
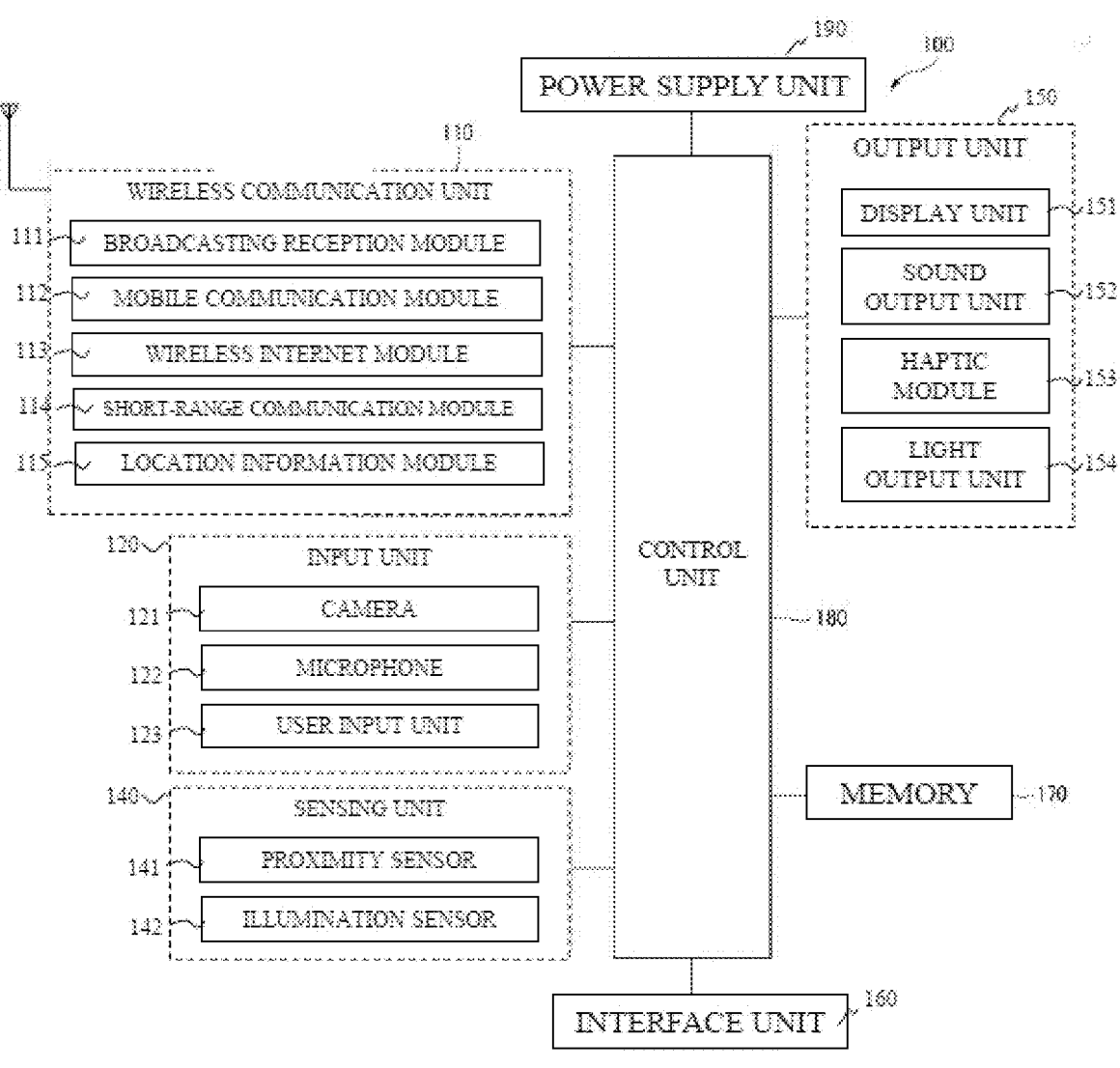
FIG. 1 is a block diagram for describing an electronic device related to the present disclosure.

The accompanying drawings, which are included as part of the detailed description to help understanding of the present disclosure, provide embodiments of the present disclosure, and explain technical features of the present disclosure together with the detailed description.

DETAILED DESCRIPTION OF EXEMPLARY EMBODIMENTS

Hereinafter, exemplary embodiments of the present disclosure will be described in detail with reference to the accompanying drawings. The same or similar components will be denoted by the same reference numerals regardless of the drawing numerals, and an overlapping description for the same or similar components will be omitted. In addition, terms "module" and "unit" for components used in the following description are used only to easily write the disclosure. Therefore, these terms do not have distinct meanings or roles by themselves. In addition, in describing the embodiment disclosed in the present disclosure, if it is determined that a detailed description of the related known art may obscure the gist of the embodiment disclosed in the present disclosure, the detailed description thereof will be omitted. Further, it should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

Terms including ordinal numbers such as "first," "second,", and the like, may be used to describe various components. However, these components are not limited by these terms. The terms are used only to distinguish one component from another component.

It is to be understood that when one element is referred to as being "connected to" or "coupled to" another element, it may be directly connected or coupled to another element or connected or coupled to another element with still another element intervening therebetween. On the other hand, it should be understood that when one element is referred to as being "directly connected to" or "directly coupled to" another element, it may be connected or coupled to another element without other elements interposed therebetween.

Singular forms are intended to include plural forms unless the context clearly indicates otherwise.

It will be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

FIG. 1 is a block diagram for describing an electronic device related to the present disclosure.

An electronic device 100 includes a wireless communication unit 110, an input unit 120, a sensing unit 140, an output unit 150, an interface unit 160, a memory 170, a control unit 180, and a power supply unit 190, and the like. The components illustrated in FIG. 1 are not essential for implementing an electronic device, and the electronic devices described herein may have more or fewer components than those listed above.

More specifically, the wireless communication unit 110 of the components may include one or more modules which allow wireless communication between the electronic device 100 and a wireless communication system, between the electronic device 100 and other electronic devices 100, or the electronic device 100 and an external server. In addition, the wireless communication unit 110 may include one or more modules which connect the electronic device 100 to one or more networks.

The wireless communication unit 110 may include at least one of a broadcast receiving module 111, a mobile communication module 112, a wireless Internet module 113, a short range communication module 114, and a location information module 115.

The input unit 120 may include a camera 121 or an image input unit for inputting an image signal, a microphone 122 for inputting a sound signal, an audio input unit, or a user input unit 123 (for example, a touch key, a push key, and the like) for receiving information from a user. Voice data or image data collected by the input unit 120 may be analyzed and processed by a control command of a user.

The sensing unit 140 may include one or more sensors for detecting at least one of information in the electronic device, surrounding environment information surrounding the electronic device, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a fingerprint sensor, an ultrasonic sensor, an optical sensor (e.g., see a camera 121), a microphone (see 122), a battery gauge, an environmental sensor (e.g., it may include at least one of a barometer, a hygrometer, a thermometer, a radiation detection sensor, a thermal detection sensor, a gas detection sensor, etc.), and a chemical sensor (e.g., an electronic nose, a healthcare sensor, a biometric sensor, etc.). Meanwhile, the electronic device disclosed in the present disclosure may use a combination of pieces of information detected by at least two or more of these sensors.

The output unit 150 is used to generate an output related to sight, hearing, tactile sense, or the like, and may include at least one of a display unit 151, a sound output unit 152, a haptic module 153, and an optical output unit 154. The display unit 151 forms a mutual layer structure with or is integrally formed with the touch sensor, thereby implementing a touch screen. The touch screen may function as the user input unit 123 which provides an input interface between the electronic device 100 and the user, and may provide an output interface between the electronic device 100 and the user.

The interface unit 160 serves as a path of various types of external devices connected to the electronic device 100. The interface unit 160 may include at least one of a wired/wireless headset port, an external charger port, a wired/wireless data port, a memory card port, a port for connection of a device including an identity module, an audio input/output (I/O) port, a video input/output (I/O) port, and an earphone port. In the electronic device 100, appropriate control related to the connected external device may be performed in response to the connection of the external device to the interface unit 160.

In addition, the memory 170 stores data for supporting various functions of the electronic device 100. The memory 170 may store a plurality of application programs or applications that are run by the electronic device 100, and data and instructions for operating the electronic device 100. At least some of these application programs may be downloaded from the external server via wireless communication. In addition, at least some of these application programs may be present on the electronic device 100 from the time of shipment for basic functions (for example, an incoming and outgoing call function, and a message reception and transmission function) of the electronic device 100. Meanwhile, the application program may be stored in the memory 170, installed on the electronic device 100, and run by the control unit 180 to perform the operation (or function) of the electronic device.

In addition to the operation related to the application program, the control unit 180 typically controls the overall operation of the electronic device 100. The control unit 180 may provide or process appropriate information or a function for a user by processing signals, data, information, and the like, which are input or output through the above-described components, or by running an application program stored in the memory 170.

In addition, the control unit 180 may control at least some of the components described with reference to FIG. 1 to run the application program stored in the memory 170. In addition, the control unit 180 may operate at least two or more of the components included in the electronic device 100 in combination with each other to run the application program.

The power supply unit 190 receives power from an external power source and an internal power source under the control of the control unit 180 and supplies the received power to each component included in the electronic device 100. The power supply unit 190 includes a battery which may be a built-in battery or a replaceable battery.

At least some of the components may cooperatively operate in order to implement the operation, control, or control method of the electronic device according to various embodiments described below. In addition, the operation, control, or control method of the electronic device may be implemented on the electronic device by running at least one application program stored in the memory 170.

In the present disclosure, the electronic device 100 may be collectively referred to as an electronic device.

Figure 2:
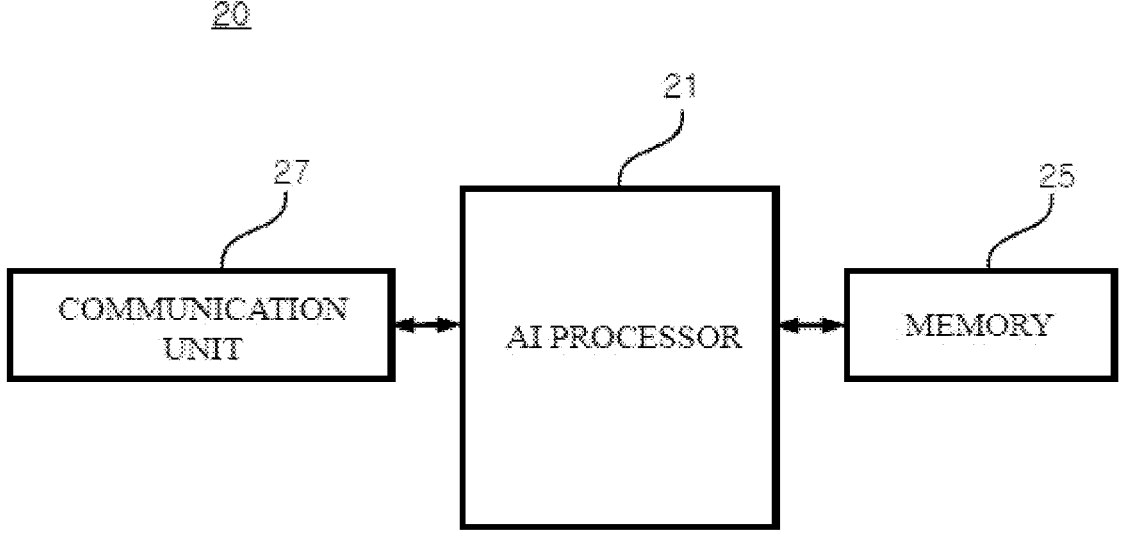
FIG. 2 is a block diagram of an artificial intelligence (AI) device according to an embodiment of the present disclosure.

FIG. 2 is a block diagram of an artificial intelligence (AI) device according to an embodiment of the present disclosure.

The AI device 20 may include an electronic device including an AI module capable of performing AI processing, a server including the AI module, or the like. In addition, the AI device 20 may be included as at least a part of the electronic device 100 illustrated in FIG. 1 and may be provided to be performed in conjunction with at least some components of the electronic device 100 during AI processing.

The AI device 20 may include an AI processor 21, a memory 25, and/or a communication unit 27.

The AI device 20 is a computing device capable of learning neural networks, and may be implemented in various electronic devices such as a server, a desktop personal computer (PC), a notebook PC, and a tablet PC.

The AI processor 21 may learn the AI model using a program stored in the memory 25. In particular, the AI processor 21 may learn the AI model in order to provide an education service to a user.

Such an AI model may include a DP-multi tasking learning (DP-MTL) model to be described later. For example, the DP-MTL may be a multi-task learning framework that assesses a student as a whole through three main tasks (e.g., knowledge tracing (KT), option tracing (OT), and score prediction (SP)). For example, KT may model a student's knowledge state to track each individual's master state improvement in a domain under test. Before deep learning became popular, as a statistical model, item response theory (IRT) (Gonz'alez-Brenes, Huang, and Brusilovsky 2014; Khajah et al. 2014; Yudelson, Koedinger, and Gordon 2013;

Pel'anek 2017; Gervet et al. 2020) and Bayesian knowledge tracing (BKT) were used to assess students' mastery of knowledge elements.

However, with the development of machine learning and deep learning, a time series-based approach to KT has been presented (Piech et al. 2015; Zhang et al. 2017; Choi et al. 2020).

OT is a task of predicting an option that students with a particular skill level are more likely to choose. Several IRT studies based on OT (polytonomous IRT) have handled ordered categorical responses carried out through psychometric tests in areas of social sciences such as psychiatry and adult attachment (Bacci, Bartolucci and Gnaldi 2014, Faley, Waller, and Brennan 2000).

Student SP is also an important task in the field of AI education (Loh, Chae and Hwang 2020; Iqbal et al. 2017; Sweeney, Lester, and Langwala 2015). Common methodologies used for SP include matrix factorization (Elbadrawy and Karypis 2016; Sweeney et al. 2016) and a regression model (Morsy and Karypis 2017; Ren et al. 2019). Some studies use a KT algorithm to predict a student score as a downstream task (Liu et al. 2019).

Meanwhile, the AI processor 21 for performing the functions as described above may be a general purpose processor (for example, a central processing unit (CPU)), but may be an AI dedicated processor (for example, a graphics processing unit (GPU)) for AI learning.

The memory 25 may store various programs and data required for operation of the AI device 20. The memory 25 may be implemented by a non-volatile memory, a volatile memory, a flash memory, a hard disc drive (HDD), a solid state drive (SSD), or the like. The memory 25 is accessed by the AI processor 21, and readout/recording/correction/deletion/update, and the like, of data in the memory 25 may be performed by the AI processor 21. In addition, the memory 25 may store a neural network model (e.g., a deep learning model) generated through a learning algorithm for data classification/recognition according to an embodiment of the present disclosure.

Meanwhile, the AI processor 21 may include a data learning unit which learns a neural network for data classification/recognition. For example, the data learning unit acquires learning data to be used for learning, and applies the obtained learning data to the deep learning model, thereby making it possible to train the deep learning model.

The communication unit 27 may transmit the AI processing result by the AI processor 21 to an external electronic device.

Here, the external electronic device may include other terminals and servers.

Meanwhile, although the AI device 20 illustrated in FIG. 2 has been described as functionally divided into the AI processor 21, the memory 25, the communication unit 27, and the like, the above-described components may be integrated into one module and called an AI module.

Typically within the edutech marketplace or the in-house technology stack, IRT is used to calculate the probability that a student will answer a question correctly. The IRT is a model that calculates the probability that a student will answer a specific question correctly using variables such as the difficulty of the question.

However, the existing IRT predicts the variables and calculates the probability based only on whether the student answered the question correctly. That is, the calculation is performed only with data on whether or not the student answered the question correctly. Therefore, although it is possible to obtain data on which incorrect answer the student selected, there is a problem in that the data is not used properly. For example, assume that a certain question has choices A, B, C, D, and E. When A is a correct answer, B is an incorrect answer similar to the correct answer, and C, D, and E are completely incorrect answers, the existing IRT (e.g., D-IRT) treats students who choose B and students who choose C, D, and E equally, but in fact, the existing IRT model may not take into account that students who choose B may have higher skills than those who choose C, D, and E.

To solve this problem, the present disclosure proposes a DP-MTL model that adds the polytonomous IRT (P-IRT) to the existing IRT.

The P-IRT is a model that predicts which choice a student will choose, and is a model that predicts which choice a student will most likely choose, rather than predicting the student's answer with a simple correct answer. However, the P-IRT only considers the probability of students choosing a certain option, but does not consider whether the question is answered correctly. To solve this, the DP-MTL model may be configured by combining the IRT (e.g., D-IRT) and the P-IRT.

In addition, in order to predict additional potential student skill, the multi-dimensional IRT that may be understood more specifically by vectorizing each student's conceptual understanding may be added.

The existing IRT (e.g., D-IRT) model may be calculated, for example, as in Equation 1 below.

$$p_i(\theta) = c_i + \frac{1 - c_i}{1 + e^{-a_i(\theta - b_i)}} \qquad \text{[Equation 1]}$$

Referring to Equation 1, $p_i$ denotes a probability that a student will answer an i-option (index) question, $\theta$ denotes a student's skill (e.g., indicating a student's ability) parameter to solve the question, and $a_i$ denotes an item for an i-option question (discriminatory) parameter, and bi denotes a difficulty parameter for the i option question. $c_i$ denotes a pseudo guessing parameter for the i-option question. The parameters may be obtained through a gradient descent algorithm or a known algorithm having a similar purpose.

Unlike the existing IRT model, the DP-MTL model is a model that predicts a student's answer by calculating 1) a correct answer, 2) which wrong answer was chosen, and 3) a student's potential skill level.

The DP-MTL may be composed of a combined version of dichotomous option correctness (D) and polytonomous option choice (P) with a ratio of $\lambda:1-\lambda$ where $0 \leq \lambda \leq 1$.

1. Dichotomous Option Correctness(D)

A traditional dichotomous model may be trained by minimizing negative log likelihood for observations of interactions that include pairs corresponding to users, questions, and correct answers. This is equivalent to maximizing a conditional probability of a user corresponding to a correct/incorrect answer of an item based on a student's interaction data.

Equation 2 below is an example of a method for training the dichotomous model.

$$L_D(\theta_u, a_i) = \sum_{i,u} [x_{i,u} \log[P(x_{i,u} \mid \theta_u, a_i)] \qquad \text{[Equation 2]}$$
$$+ (1 - x_{i,u}) \log[P(1 - x_{i,u} \mid \theta_u, a_i)]]$$

Here, $L_D$ denotes a negative log likelihood, which may be minimized. In addition, u denotes a student index, $\theta_u$ denotes a skill parameter of student u, $a_i$ denotes the overall item parameter (for example, it may include $a_i$ in Equation 1) constituting the i-option (index) question, $x_{i,u}$ denotes a binary variable that determines whether student u answered the i-option question correctly.

2. Polytonomous Option Choice(P)

The polytonomous model may be trained by minimizing the negative log likelihood ($L_P(\theta_u, a_i)$). Equation 3 is an example of a method for training a polytonomous model. For example, the polytonomous model may consider a characteristic of a question with more than one choice.

$$L_P(\theta_u, a_i) = \sum_{i,u} \log[P(o_{u,i} \mid \theta_u, a_i)] \qquad \text{[Equation 3]}$$

Referring to Equation 3, may be calculated by Equation 4 below.

$$P(\text{choice} = o \mid a, \theta) = \frac{\exp(a_o\theta + b_o)}{\sum_{b'=1}^{j} \exp(a_{o'}\theta + b_{o'})} \qquad \text{[Equation 4]}$$

Referring to Equation 4, 0 denotes a student's skill parameter, $a_o$ denotes an item parameter for question option (index) $o_{u,j}$, and $b_o$ denotes a difficulty parameter for option o. j may denote the total number of options.

Also, referring to Equation 2 again, $P(1-x_{i,u}|\theta_u,a_i)$ may be replaced by $\sum_{o_{u,j}\neq o_i^*} P(o_{u,j}|\theta_u,a_i)$ which is the sum of the probabilities that a student chooses an incorrect value.

Therefore, $L_D$ in Equation 2 may be calculated again by Equation 5 below.

$$L_D(\theta_u, a_i) = \sum_{i,u} [x_{i,u} \log[P(o_{i,u} \mid \theta_u, a_i)] \qquad \text{[Equation 5]}$$
$$+ (1 - x_{i,u}) \log\left[\sum_{o_{u,i}\neq o_i^*} P(o_{i,u} \mid \theta_u, a_i)\right]]$$

3. DP-MTL

In the present disclosure, based on Equations 3 and 5, a learning object of the DP-MTL model may be defined as Equation 6 below.

$$\lambda L_D + (1-\lambda)L_P \qquad \text{[Equation 6]}$$

Accordingly, referring to Equation 7 below, an objective function of the DP-MTL model may be derived by combining two objective functions.

$$L_{DP}(\theta_u, a_i) = \lambda L_D + (1 - \lambda)L_P \qquad \text{[Equation 7]}$$
$$= \sum_{i,u} [\lambda[x_{i,u} \log[P(o_{u,i} \mid \theta_u, a_i)]$$
$$+ (1 - x_{i,u}) \log\left[\sum_{o_{u,i}\neq o_i^*} P(o_{u,i} \mid \theta_u, a_i)\right]]$$
$$+ (1 - \lambda) \log[P(o_{u,i} \mid \theta_u, a_i)]]$$

Figure 3:
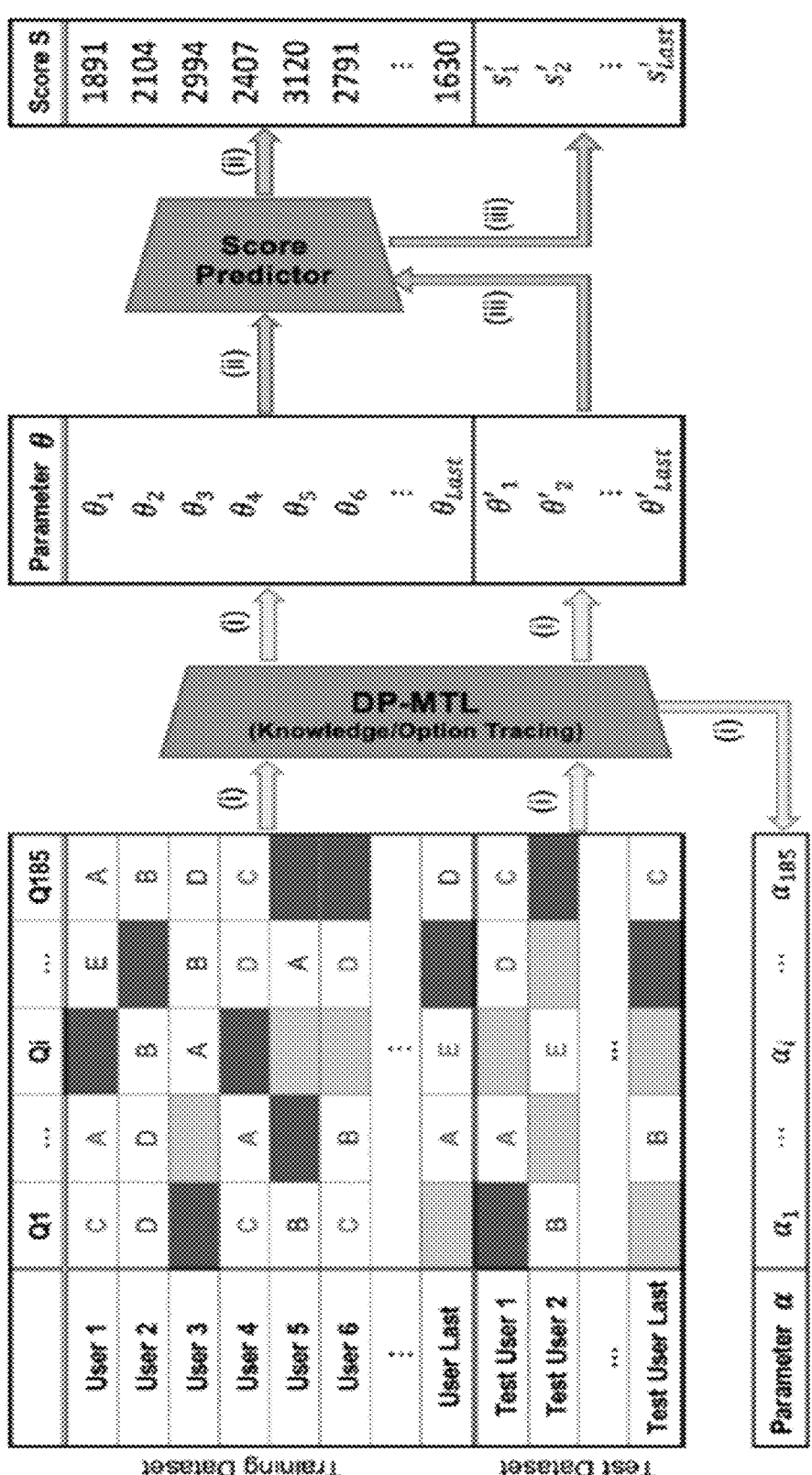
FIG. 3 is an example of a pipeline for an experiment of a DP-multi tasking learning (DP-MTL) model to which the present disclosure may be applied.

FIG. 3 is an example of a pipeline for an experiment of the DP-multi tasking learning (DP-MTL) model to which the present disclosure may be applied.

Unlike the existing IRT model, the DP-MTL model is a model that predicts a student's score by calculating whether a student answers a question correctly, and when a student chooses an incorrect answer, which incorrect answer the student chooses from the choices, and the student's potential skill level.

Referring to FIG. 3, the DP-MTL model may be trained through a training dataset. The training dataset and the test dataset may include masked data about which choice is chosen for each question (Q) for each user in order to validate whether training and learning have been performed properly. The DP-MTL model may be trained through Equation 7 above by receiving data on whether the user selects a correct answer to a question or which incorrect answer the user has chosen when the user chooses an incorrect answer. Referring to (i), the DP-MTL model may measure the skill parameter $\theta$ of the user and the item parameter a of the question. (ii) The skill parameter $\theta$ of the user may be used as a user representation for a downstream SP task. (iii) The performance of the SP task may be measured for each user in a test split as an assessment metric for the quality of user representation. (i) and (ii) may denote a KT/OT pipeline, and (iii) may denote an SP pipeline.

Figure 4:
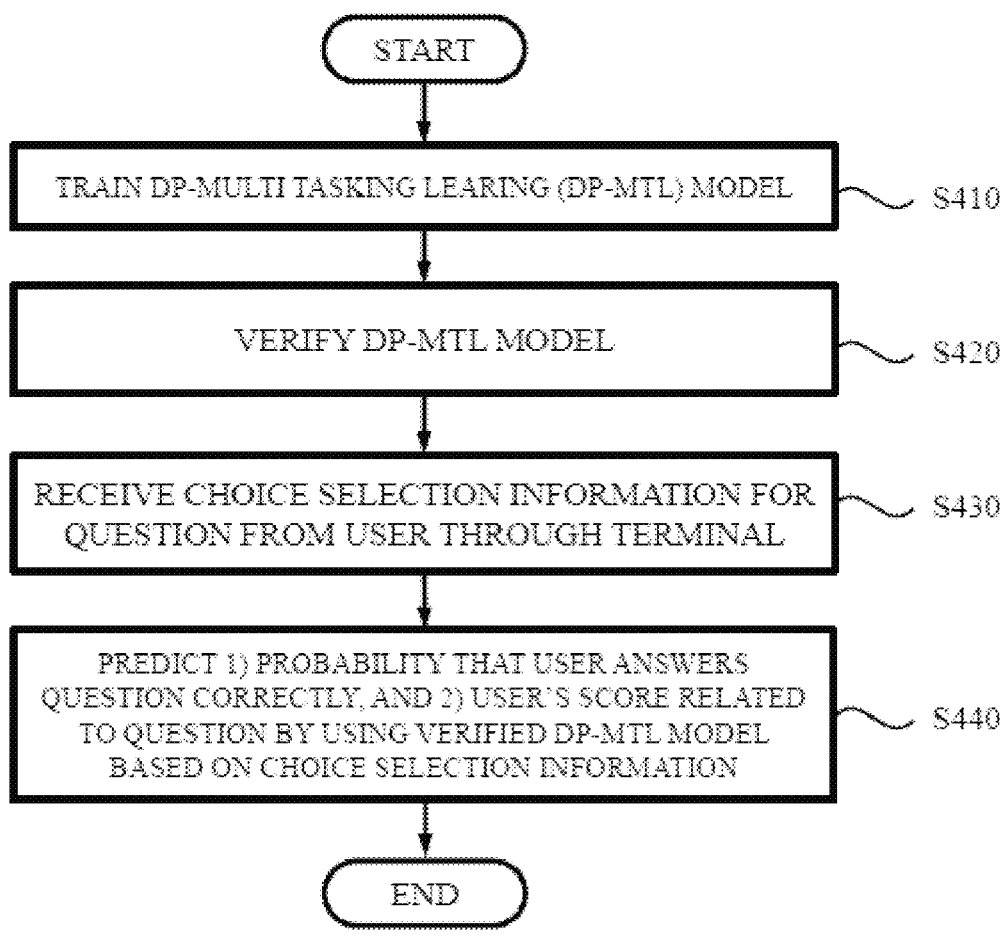
FIG. 4 is an embodiment of an electronic device to which the present disclosure may be applied.

FIG. 4 is an embodiment of an electronic device to which the present disclosure may be applied.

Referring to FIG. 4, the electronic device includes a communication module for communication with the terminal, a memory, and a processor, and may train the DP-MTL model through a program stored in the memory.

The electronic device trains a DP-multi tasking learning (DP-MTL) model (S410). For example, the DP-MTL model may be a model that predicts a user's score based on 1) information on whether a user answers a question correctly, 2) when the user chooses an incorrect answer, information on which incorrect answer the user chooses, and 3) a user's potential skill level. In more detail, the electronic device may input the training dataset to the DP-MTL model, and calculate a and $\theta$ parameters for minimizing ($L_{DP}(\theta_u, a_i)$) based on Equation 7. The electronic device may use the calculated a and $\theta$ parameters to learn both information on whether a user chooses a correct answer (knowledge tracing (KT)) and which choice the user exactly chooses (choice tracing (CT)) by the DP-MTL.

The electronic device verifies the DP-MTL model (S420). For example, the electronic device may verify the training dataset. In more detail, the electronic device may train the DP-MTL model while reducing the size of the training dataset (e.g., 30%, 20%, 10% . . . ), and use a dataset with a small DP-MTL model to verify how effectively KT, CT, and SP progress. In addition, the electronic device may perform verification on $\lambda$ to minimize the ($L_{DP}(\theta_u, a_i)$).

The electronic device receives the choice selection information related to a question from the user through the terminal (S430). For example, the choice selection information may include information on which choice a user chooses for each question. The terminal may provide a question to a user, and may receive choices for the question from the user.

The electronic device uses the verified DP-MTL model based on the choice selection information to predict 1) the probability that a user answers a question correctly and 2) the score related to the user's question (S440).

The present disclosure described above enables the program to be embodied as computer readable code on a medium on which the program is recorded. A computer readable medium may include all kinds of recording devices in which data that may be read by a computer system is stored. An example of the computer readable medium may include a HDD, an SSD, a silicon disk drive (SDD), a read only memory (ROM), a random access memory (RAM), a compact disc-read only memory (CD-ROM), a magnetic tape, a floppy disk, an optical data storage, and the like, and also include a medium implemented in the form of a carrier wave (for example, transmission through the Internet). Therefore, the above-mentioned detailed description is to be interpreted as being illustrative rather than being restrictive in all aspects. The scope of the present disclosure should be determined by reasonable interpretation of the appended claims, and all changes within the equivalent scope of the present disclosure are included in the scope of the present disclosure.

According to an embodiment of the present disclosure, it is possible to implement SP for predicting a student's score in proportion to KT, CT, and $\theta$ values that calculate whether students are most likely to answer which choice for a given question and whether an answer is correct or incorrect.

In addition, according to an embodiment of the present disclosure, generalizability of a student assessment framework can improve a variety of educational applications including identifying students' vulnerabilities and recommending customized questions.

Effects which can be achieved by the present disclosure are not limited to the above-described effects. That is, other effects that are not described may be obviously understood by those skilled in the art to which the present disclosure pertains from the above detailed description.

In addition, although the services and embodiments have been mainly described hereinabove, this is only an example and does not limit the present disclosure. Those skilled in the art to which the present disclosure pertains may understand that several modifications and applications that are not described in the present specification may be made without departing from the spirit of the present disclosure. For example, each component described in detail in an exemplary embodiment of the present invention may be modified. In addition, differences associated with these modifications and applications are to be interpreted as being included in the scope of the present disclosure as defined by the following claims.

What is claimed is:

1. A method of predicting a user's score on a question by an electronic device including an artificial intelligence (AI) processor and a memory storing a dichotomous-polytomous (DP)-multi tasking learning (DP-MTL) model and non-transitory computer readable instructions executable by the AI processor, the method performed by the AI processor and comprising:

training the DP-MTL model;

verifying the DP-MTL model;

receiving choice selection information related to the question from the user through a terminal; and predicting 1) a probability that the user answers the question correctly and 2) the user's score related to the question using the verified DP-MTL model based on the choice selection information, wherein the DP-MTL model is a model for predicting the user's score based on 1) information on whether the user answers the question correctly, 2) information on which incorrect answer is selected among choices of the question when the user selects an incorrect answer, and 3) a skill level of the user, wherein the DP-MTL model is a multi-task learning framework that assesses an individual through tasks including (i) knowledge tracing (KT) for providing a binary classification of accuracy on a question for the individual, (ii) option tracing (OT) for predicting a choice that the individual is more likely choose among choices of the question as an answer and (iii) score prediction (SP), wherein the training of the DP-MTL model comprises:

inputting, to the DP-MTL model, training dataset including masked data about which choice is chosen among choices of each question of a plurality of questions for each user of a plurality of users, and applying the training dataset to the DP-MTL model, wherein the training of the DP-MTL model is based on the following Equation:

$$
\begin{aligned}
L_{DP}(\theta_u, a_i) &= \lambda L_D + (1 - \lambda) L_P \\
&= \sum_{i,u} [\lambda [x_{i,u} \log[P(o_{u,i} \mid \theta_u, a_i)] \\
&\quad + (1 - x_{i,u}) \log\left[\sum_{o_{u,i \neq o_i^*}} P(o_{u,i} \mid \theta_u, a_i)\right]] \\
&\quad + (1 - \lambda) \log[P(o_{u,i} \mid \theta_u, a_i)]]
\end{aligned}
$$

the u denotes a parameter indicating the user, the $\theta$ denotes a parameter indicating the skill level of the user, and the $a_i$ denotes an item parameter constituting an i-th question, and wherein the verifying of the DP-MTL model comprises training the DP-MTL model while reducing a size of the training dataset to verify how effectively the DP-MTL model processes the tasks.

2. The method of claim 1, wherein, in the training of the DP-MTL model, the $a_i$ and the $\theta$ are calculated to minimize the ($L_{DP}(\theta_u, a_i)$).

3. The method of claim 1, wherein, in the verifying of the DP-MTL model, the $\lambda$ is verified to minimize the ($L_{DP}(\theta_u, a_i)$).

4. An electronic device for predicting a user's score on a question, the electronic device comprising:

a communication module configured to communicate with a terminal;

a memory storing a dichotomous-polytomous (DP)-multi tasking learning (DP-MTL) model and non-transitory computer readable instructions; and an artificial intelligence (AI) processor, wherein the AI processor is configured to execute the instructions to:

train the DP-MTL model, verify the DP-MTL model, receive choice selection information related to the question from the user through the terminal, and predict 1) a probability that the user answers the question correctly and 2) the user's score related to the question using the verified DP-MTL model based on the choice selection information, wherein the DP-MTL model is a model for predicting the user's score based on 1) information on whether the user answers the question correctly, 2) information on which incorrect answer is selected among choices of the question when the user selects an incorrect answer, and 3) a skill level of the user, wherein the DP-MTL model is a multi-task learning framework that assesses an individual through tasks including (i) knowledge tracing (KT) for providing a binary classification of accuracy on a question for the individual, (ii) option tracing (OT) for predicting a choice that the individual is more likely choose among choices of the question as an answer, and (iii) score prediction (SP), wherein the training of the DP-MTL model comprises:

inputting, to the DP-MTL model, training dataset including masked data about which choice is chosen among choices of each question of a plurality of questions for each user of a plurality of users, and applying the training dataset to the DP-MTL model, wherein the training of the DP-MTL model is based on the following Equation:

$$
\begin{aligned}
L_{DP}(\theta_u, a_i) &= \lambda L_D + (1 - \lambda) L_P \\
&= \sum_{i,u} [\lambda [x_{i,u} \log[P(o_{u,i} \mid \theta_u, a_i)] \\
&\quad + (1 - x_{i,u}) \log\left[\sum_{o_{u,i \neq o_i^*}} P(o_{u,i} \mid \theta_u, a_i)\right]] \\
&\quad + (1 - \lambda) \log[P(o_{u,i} \mid \theta_u, a_i)]]
\end{aligned}
$$

the u denotes a parameter indicating the user, the $\theta$ denotes a parameter indicating the skill level of the user, and the $a_i$ denotes an item parameter constituting an i-th question, and wherein the verifying of the DP-MTL model comprises training the DP-MTL model while reducing a size of the training dataset to verify how effectively the DP-MTL model processes the tasks.

5. The electronic device of claim 4, wherein the processor calculates the $a_i$ and the $\theta$ to minimize the ($L_{DP}(\theta_u, a_i)$) and trains the DP-MTL model.

6. The electronic device of claim 4, wherein the processor verifies the $\lambda$ to minimize ($L_{DP}(\theta_u, a_i)$) in order to verify the DP-MTL model.

* * * * *